United States Patent [19]

Drobish et al.

[11] Patent Number: 4,728,006
[45] Date of Patent: Mar. 1, 1988

[54] FLEXIBLE CONTAINER INCLUDING SELF-SEALING DISPENSING VALVE TO PROVIDE AUTOMATIC SHUT-OFF AND LEAK RESISTANT INVERTED STORAGE

[75] Inventors: James L. Drobish; Leo E. Taske, both of Cincinnati, Ohio

[73] Assignee: The Procter & Gamble Company, Cincinnati, Ohio

[21] Appl. No.: 656,397

[22] Filed: Oct. 1, 1984

Related U.S. Application Data

[63] Continuation-in-part of Ser. No. 604,782, Apr. 27, 1984, abandoned.

[51] Int. Cl.⁴ .............................................. B05B 11/04
[52] U.S. Cl. .................................... 222/181; 137/849; 137/859; 222/213; 222/490; 222/494
[58] Field of Search ............... 222/213, 212, 490, 494, 222/496, 511, 491, 497, 181, 96, 209, 495, 180, 185, 173; 137/846, 849, 859; 239/602, 533.13, 533.14

[56] References Cited

U.S. PATENT DOCUMENTS

| 591,067 | 10/1897 | Wallace | 222/490 UX |
|---|---|---|---|
| 666,145 | 1/1901 | Kennedy | 137/854 X |
| 1,122,868 | 12/1914 | Davis | 222/490 |
| 1,206,661 | 11/1916 | Booth | 222/490 |
| 1,242,654 | 10/1917 | Chapman | 222/490 |
| 1,607,993 | 11/1926 | Loewy | 222/490 |
| 1,825,553 | 9/1931 | Smith | 222/490 |
| 1,845,918 | 2/1932 | Janssen | 222/490 |
| 1,859,397 | 5/1932 | Johnson et al. | 222/490 |
| 1,951,544 | 3/1934 | Burrell | 222/490 |
| 1,989,145 | 1/1935 | Newby | 222/490 X |
| 1,989,201 | 1/1935 | Kurtz et al. | 401/186 |
| 1,989,714 | 2/1935 | Statham | 222/490 |
| 1,989,715 | 2/1935 | Statham | 222/490 |
| 2,092,757 | 9/1937 | Groeniger | 137/849 X |
| 2,161,230 | 6/1939 | Nelson | 222/494 X |
| 2,175,052 | 10/1939 | Bull et al. | 222/490 |
| 2,193,517 | 3/1940 | Lindstrom | 222/490 |
| 2,234,558 | 3/1941 | Huston | 401/186 |
| 2,352,642 | 7/1944 | Langdon | 137/849 |

(List continued on next page.)

FOREIGN PATENT DOCUMENTS

| 108636 | 5/1984 | European Pat. Off. | |
|---|---|---|---|
| 696571 | 9/1940 | Fed. Rep. of Germany | |
| 1486403 | 5/1969 | Fed. Rep. of Germany | 222/490 |
| 0996998 | 12/1951 | France | 222/490 |
| 0357149 | 11/1961 | Switzerland | 222/490 |
| 764928 | 1/1957 | United Kingdom | |
| 1046518 | 10/1966 | United Kingdom | 222/490 |
| 2098958 | 12/1982 | United Kingdom | 222/181 |
| 0145824 | 6/1962 | U.S.S.R. | 137/849 |

Primary Examiner—Joseph J. Rolla
Assistant Examiner—Kevin P. Shaver
Attorney, Agent, or Firm—E. Kelly Linman; John V. Gorman; Richard C. Witte

[57] ABSTRACT

A resiliently deformable container having at least one discharge orifice equipped with a self-sealing dispensing valve, said valve having a resiliently deformable, concave shaped portion with its perimeter sealingly secured across the container's discharge orifice. The self-sealing valve is secured across the orifice so that it is inwardly concave when the container is in an undeformed condition. The concave shaped portion of the valve includes at least one substantially linear slit extending through the thickness of the valve. The valve requires the attainment of a threshold opening pressure to effect inversion from a concave at rest position in order to dispense the package contents. By providing a container with sufficient flexibility to permit manual deformation and sufficient resilience to return substantially to its undeformed configuration when the externally applied forces are removed, a void volume equivalent to the amount of fluid material discharged from the package is provided inside the container after removal of the applied forces. This aids in closing the self-sealing valve which, after venting the container to the atmosphere, returns to an inwardly concave, sealed position until sufficiently large external forces are again applied to the container to effect inversion of the valve and consequent material discharge.

35 Claims, 12 Drawing Figures

U.S. PATENT DOCUMENTS

| | | | |
|---|---|---|---|
| 2,362,523 | 11/1944 | Armstrong, Jr. et al. | 222/181 |
| 2,392,085 | 1/1946 | Ferrel | 222/490 UX |
| 2,441,649 | 5/1948 | Sprague | 222/92 |
| 2,505,441 | 4/1950 | Taverner | 222/490 X |
| 2,513,272 | 7/1950 | Bowen | 222/490 |
| 2,577,780 | 12/1951 | Lockhart | 604/415 |
| 2,594,040 | 4/1952 | LeClair | 222/490 X |
| 2,611,515 | 9/1952 | Smith | 222/213 |
| 2,643,408 | 6/1953 | Decker | 401/183 |
| 2,670,757 | 3/1954 | Delany | 137/849 X |
| 2,682,057 | 6/1954 | Lord | 137/849 X |
| 2,688,979 | 9/1954 | Kendrick | 137/849 X |
| 2,743,852 | 5/1956 | Alberdi, Jr. | 222/494 |
| 2,758,755 | 8/1956 | Schafler | 222/490 |
| 2,802,607 | 8/1957 | Kalmbach, Jr. et al. | 222/490 |
| 2,818,089 | 12/1957 | Mayhill | 137/849 X |
| 2,887,709 | 5/1959 | Carolonza | 401/186 |
| 2,926,692 | 3/1960 | Zillman et al. | 137/849 X |
| 2,936,932 | 5/1960 | Whisler | 222/490 |
| 2,937,795 | 5/1960 | Ciliberti | 222/490 |
| 2,942,762 | 6/1960 | Fahr | 222/207 |
| 2,957,501 | 10/1960 | Holmes | 222/212 X |
| 3,012,698 | 12/1961 | Wiederquist et al. | 222/212 |
| 3,016,172 | 1/1962 | Morrow et al. | 222/490 |
| 3,067,787 | 12/1962 | Salk | 222/490 X |
| 3,192,894 | 7/1965 | Staver | 401/6 |
| 3,226,761 | 1/1966 | Adamsky | 401/183 |
| 3,241,726 | 3/1966 | Chester | 222/211 |
| 3,258,175 | 6/1966 | Taylor | 222/490 X |
| 3,320,972 | 5/1967 | High et al. | 137/849 X |
| 3,342,379 | 9/1967 | Foley | 222/546 |
| 3,349,972 | 10/1967 | Whiteford | 222/212 |
| 3,428,223 | 2/1969 | Lewiecki et al. | 222/490 X |
| 3,445,042 | 5/1969 | Elmore et al. | 222/212 |
| 3,669,323 | 6/1972 | Harker et al. | 222/490 |
| 3,674,183 | 7/1972 | Venable et al. | 222/212 |
| 3,726,436 | 4/1973 | Despain et al. | 222/213 |
| 3,945,060 | 3/1976 | Gargione | 4/228 |
| 3,957,078 | 5/1976 | Hlinsky | 137/849 X |
| 3,979,163 | 9/1976 | Beard | 401/139 |
| 3,981,106 | 9/1976 | Gallo | 51/359 |
| 3,998,360 | 12/1976 | Mack | 222/181 |
| 4,008,968 | 2/1977 | Hobbs | 401/207 |
| 4,074,944 | 2/1978 | Xavier | 401/182 |
| 4,096,597 | 6/1978 | Duse | 222/494 X |
| 4,109,836 | 8/1978 | Falarde | 222/494 |
| 4,133,457 | 1/1979 | Klassen | 222/212 |
| 4,139,124 | 2/1979 | Ferrante | 222/494 X |
| 4,163,503 | 8/1979 | Amneus | 222/95 |
| 4,166,553 | 9/1979 | Fraterrigo | 222/490 X |
| 4,183,684 | 1/1980 | Avery, Jr. | 401/133 |
| 4,201,491 | 5/1980 | Kohler | 222/490 X |
| 4,222,126 | 9/1980 | Boretos et al. | 623/2 |
| 4,226,342 | 10/1980 | Laauwe | 222/494 |
| 4,314,658 | 2/1982 | Laauwe | 222/213 |
| 4,356,935 | 11/1982 | Kamin | 222/490 X |
| 4,388,735 | 6/1983 | Ionescu et al. | 623/2 |
| 4,397,132 | 8/1983 | Pardes et al. | 53/471 |
| 4,408,702 | 10/1983 | Horvath | 222/496 X |
| 4,420,101 | 12/1983 | O'Neill | 222/212 |
| 4,519,530 | 5/1985 | Schmidt | 222/494 |

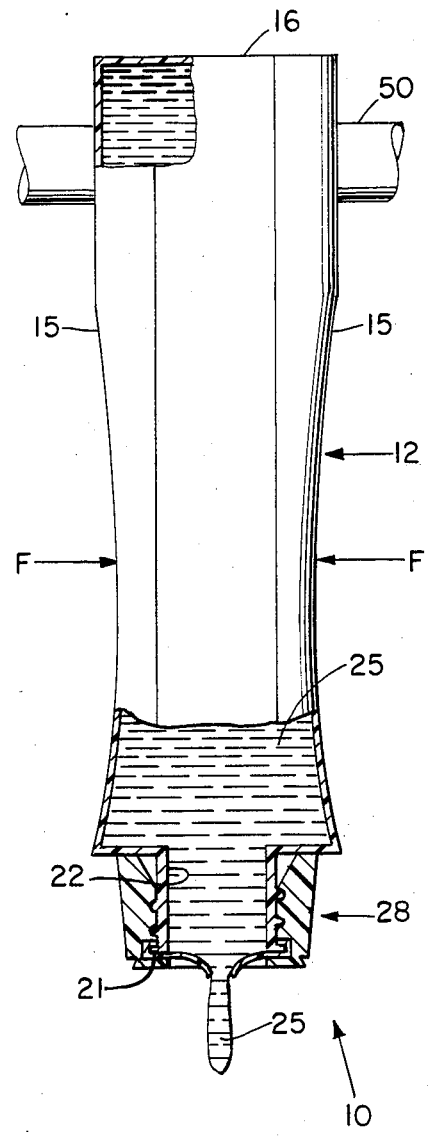
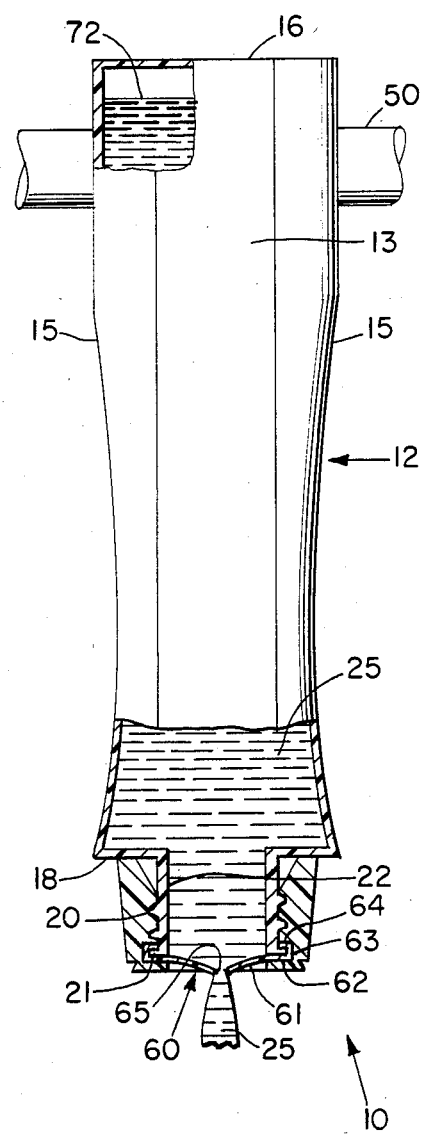

FLEXIBLE CONTAINER INCLUDING SELF-SEALING DISPENSING VALVE TO PROVIDE AUTOMATIC SHUT-OFF AND LEAK RESISTANT INVERTED STORAGE

CROSS-REFERENCE TO RELATED APPLICATION

This application is a continuation-in-part of commonly assigned, copending application Ser. No. 604,782, filed Apr. 27, 1984 in the name of the present applicants and now abandoned.

TECHNICAL FIELD

The present invention has relation to packages for storing and dispensing various fluid or fluidized materials.

The present invention has further relation to packages for storing and dispensing viscous fluid materials such as shampoos, conditioners, soaps, detergents, cooking oils and the like without the need to remove or manipulate the closure member normally used to prevent dry out or loss of the package contents intermediate dispensing cycles.

The present invention has particular relation to flexible packages provided with a dispensing valve which will open to discharge the package contents at a predetermined threshold pressure when external forces are applied to the package, but which will close spontaneously when the external forces are removed from the package or when the internal pressure of the package is otherwise reduced. Since the valve remains closed below the chosen threshold pressure, the package may be handled without inadvertent discharge and stored inverted if so desired.

The present invention has even further relation to flexible packages having a degree of flexibility sufficient to permit manual deformation thereof and a degree of resilience sufficient to return to a substantially undeformed condition when manually applied forces are removed from the package. The vacuum created within the package is vented by the resiliently deformable dispensing valve which also functions to cut off the flow of fluid material being dispensed from the package.

BACKGROUND ART

Self sealing fitments which eliminate the need for a conventional closure intermediate dispensing cycles are generally known in the art. For example, U.S. Pat. No. 2,175,052 issued to Bull et al. on Oct. 3, 1939 discloses a dispensing closure for attachment to containers for materials such as toothpaste, shaving cream, etc. to which internal pressure is applied to discharge the contents therefrom. According to Bull et al., the invention comprises a cap having a flexible, stretchable resilient member for attachment to the end of a dispensing container, the member being so constructed in proportion that, at least during operation, stresses and strains in the resilient member are directed toward the central end portion of the cap. In the illustrated embodiment, the Bull et al. invention is in the form of a cap having a tubular body open at one end and closed at the other end. The body is made of flexible, stretchable resilient material, preferably a vulcanized, soft, elastic rubber composition. An end wall is connected to the tubular sidewalls by means of an intermediate portion having a thickness less than that of the sidewalls. The end wall is located in such manner that it lies wholly within the tubular portion of the body, i.e., in a reentrant position. Preferably, the intermediate portion forms a frusto-conical outline in which the end having the smaller diameter unites with the end wall. A slit extends through the wall member, and a depression in the form of beveled surfaces adjacent the slit is formed in the end wall on the innermost side relative to the tubular body. The cap is connected to a conventional dispensing container such as a tube having a collapsible body made of material such as lead foil.

When the dispenser cap of Bull et al. is applied to a container, and pressure is exerted upon the container, the dispensing material is forced against the inner side of the end wall, with the result that the wall is carried outwardly. The relatively thin wall of the intermediate portion permits outward movement of the wall upon the application of pressure from within. As pressure is exerted against the dispensing material the end wall becomes distended and the slit, which is normally in a closed state, opens to permit extrusion of material from the dispensing container. When manual pressure on the dispending container is relieved, the end wall and its adjacent portions return, at least in part, to their normal, unstrained condition. During this return movement of the end wall, and when the wall is in a position substantially in the same plane as that defined by the outer end of the tubular body, as shown in FIG. 4 of the drawings, compression stresses and strains are set up in the end wall. According to Bull et al., these compression stresses and strains result from the compression stresses present in the intermediate portion when the intermediate portion becomes confined between the end wall and the tubular body during axial movement of the end wall relative to the tubular body. In this position, and as shown in FIG. 4, the compression stresses and strains present in the wall cause the surfaces defining the slit to move tightly together, thus shearing off a strip of the dispensed material. After the dispensing assembly remains in a state of rest for a short period, the cap allegedly returns to its normal, unstrained state, as shown in FIG. 1.

An alternative prior art container closure of the self-sealing variety is disclosed in U.S. Pat. No. 1,825,553 issued to Smith on Sept. 29, 1931. Smith discloses a collapsible tube which is preferably soft and flexible and may serve as a receptacle for dentifrice, shaving cream, paste, or other viscous substances. In the illustrated embodiment, the tube is provided with a relatively stiff conical end portion integral therewith, and an externally threaded neck integral with the end. The neck is provided with a large bore adjacent the end portion and a smaller cylindrical bore extending from the large bore through the top surface of the neck. The shoulder at the juncture of the bore is chamfered to form a conical seat.

The tube closures of Smith are preferably made in molds from a good grade of rubber and vulcanized to attain the desired elasticity. A tube closure such as shown in FIGS. 1–12 inclusive of Smith comprises a base and an end portion. The shoulder at the juncture of the bore and end portion is beveled to conform with the conical seat of the tube neck. The end is so arranged as to form a cavity in the base, and extending from this cavity through the end a valve slit is provided. To mount the closure in the neck of the tube it is only necessary to insert the closure through the large end of the tube ino the neck until the beveled shoulder of the closure rests across the conical seat of the neck. The tube is then filled with suitable material in the usual manner and may be supplied with a metal screw cap to protect the valve closure until delivery to the user.

In the embodiment illustrated in FIG. 14, the closure in question comprises a base and an end portion. The juncture of the base and end portion is chamfered to conform to the seat of the tube. The base is provided with a conical cavity and has its inner bottom edge chamfered to facilitate the entrance into the cavity of the tube contents when the same is being extruded. The top surface of the end portion is concave and has a valve port which may be of any of the shapes disclosed in the patent.

To extrude contents from the tube Smith discloses that it is only necessary, after the cap has been removed, to apply pressure to the tube and this pressure will froce the contents of the tube against the top of the cavity of the closure and cause the valve slit to open and allow the tube contents to pass out as shown in FIG. 3. When the pressure on the tube is released, the elasticity of the closure member allegedly forces the slit tightly closed and prevents any further extrusion of the contents.

Still another prior air collapsible tube structure is disclosed in U.S. Pat. No. 1,206,661 issued to Booth on Nov. 28, 1916. Booth discloses a collapsible tube which is provided at one end with a tubular outlet, externally theaded to receive a closure cap. In practice, the tube is filled through its opposite end, which is normally open, and is folded or rolled upon itself, to form a closure at that end in the usual manner. The material contained in the tube is discharged by folding or rolling the folded or rolled end upon the body of the tube, by compressing the tube between the thumb and fingers of the hand, or by using an expressing device of suitable construction.

Within the tube of Booth is disposed a suction or vacuum producing device shown in the form of a dome-shaped or cup-shaped body of rubber or other elastic material. This cup-shaped body has its open side facing the top of the tube and provided with a thickened rim edge to bear against the top of the tube to form therewith a suction or vacuum chamber. At its center the diaphragm cup is provided with an outlet in the form of a slit which is normally closed by the elasticity of the material when parts of the diaphragm are in normal position, as shown in FIG. 1. In expelling the material the pressure of such material on the bottom of the diaphragm causes such portion of the diaphragm to be elevated or forced into the cup toward the outlet, thus expanding the slit to form a circular opening for the outward passage of the material. When the pressure upon the diaphragm is removed, the deflected portion thereof allegedly returns to normal position by its own elasticity, thus producing a suction or partial vacuum in the vacuum chamber, whereby the excess material discharged will be drawn back into the tube. According to Booth, the form of elastic cup shown in FIGS. 1 and 2 may be used where the material stored and dispensed is comparatively light in weight and of a more or less readily flowing character. However, for heavier and denser fluids, and thus having some material degree of viscosity, the diaphragm is preferably employed in conjunction with a spring, as shown in FIG. 3, to return the deflected portion of the cup positively to normal position after actuation.

U.S. Pat. No. 2,758,755 issued to Schafler on Aug. 14, 1956 discloses still another compressible container with an automatically closing and retracting discharge nozzle. Schafler discloses a cupped membrane part of resilient material of suitable plastic or rubber substance as the closure of a compressible tube, bottle or other container. The cupped membrane may be an integral part, as shown in FIGS. 2 and 3, or it may be a separate part clinched on as an extension, of, for instance, the tube which is of compressible nature as it would be if made of metal foil. The interior surface of the bottom of said cupped part is formed with an annular channel surrounding a central well, whereby the outer surface of the bottom of said part presents a teat surrounded by the well, the surface of whose bottom wall within the cup, is concave. This teat, at its very tip has a pair of intersecting slits therethrough, as indicated in the drawings, through which paste substance in the container is expelled when the latter is compressed, as generally shown in FIG. 3. The normal rest and closed position of the components constituting the part is shown in FIG. 2.

The tube or container, filled or partially filled with past substance, will always have such substance filling the part. When pressure is applied to the container, the part will become distended as shown in FIG. 3, where the teat or discharge nozzle extends out of the cup and is discharging. According to Schafler, the teat or nozzle has actually grown in length. Upon release of such pressure, the part will again assume its normal rest condition, as generally shown in FIG. 2, where the nozzle is retracted into the cup, has become shortened and the lips of its mouth are closed, all automatically, because of the springing back of the tensed comparatively thicker wall parts which constitute the nozzle tip and at least the major portion of the annular channel walls away from the nozzle, leaving the remainder of the bottom of said part relatively thin. According to Schafler, the aforementioned shape of the bottom wall of the well facilitates the lengthening of the teat when pressure is applied to the tube and the shortening of said teat when such pressure is released.

Still another prior art liquid dispenser bottle comprised of resiliently flexible material and having a relatively thin, resiliently flexible septum of circular planform seated on and spanning the dispenser outlet is illustrated in U.S. Pat. No. 4,133,457 issued to Klassen on Jan. 9, 1979. The flexible septum is sealingly clamped in place about its periphery of a dispenser nozzle cap. The septum has a 90° butt cut slit formation defining at least one resiliently flexible valve flap integrally joined along a hinge area to the septum proper for outward deflection of the flap by internal liquid pressure when the dispenser is squeezed. The sepum is also formed with at least one tiny hole, preferably on or in the vicinity of the hinge line area to increase flexibility of the valve flap and to serve as a vent to greatly accelerate relaxation and normalization of the squeezed bottle wall.

Unfortunately, prior art structures of the aforementioned type have not proven completely satisfactory in providing a particularly preferred combination of features which are highly desirable for fluid materials. Namely: single handed dispensing of viscous fluids in response to manual forces applied to the package; spontaneous shut-off of product flow when the manual forces are removed or when the internal pressure of the package is otherwise reduced; and resistant to leakage when the package is stored in an inverted dispensing position over an extended period of time intermediate dispensing cycles.

Accordingly, it is an object of the present invention to provide a flexible storage and dispensing package comprising a resiliently deformable container equipped with a self-sealing valve which will permit discharge of the container's contents when externally applied forces generate a fluid pressure exceeding a predetermined threshold pressure, spontaneous product shut off when the manually applied forces are removed and resistance to leakage during handling even if the container is stored in an inverted position over an extended period of time intermediate dispensing cycles.

It is another object of the present invention to provide such a storage and dispensing package which provides a high degree of control over the amount of product dispensed.

It is a further object of the present invention to provide such a storage and dispensing package which is self-venting upon removal of said manually applied forces.

It is a further object of the present invention to provide such a storage and dispensing package which is inexpensive to manufacture.

It is still a further object of the present invention to provide such a storage and dispensing package with a minimum of moving parts to provide resistance to clogging and high reliability.

It is still a further object of the present invention to provide such a storage and dispensing package having a valve which is self-clearing upon the application of manual forces thereto.

It is still a further object of the present invention to provide such a storage and dispensing package which includes simple and inexpensive means for suspending or standing said package with the self-sealing valve downwardly oriented intermediate dispensing cycles.

DISCLOSURE OF INVENTION

In a particularly preferred embodiment, the present invention comprises a resiliently deformable container having at least one discharge orifice, said orifice including a resiliently deformable, diaphragm valve exhibiting a generally concave shape and having its perimeter sealingly secured to said container across said orifice. The diaphragm valve is oriented so that it is normally inwardly concave. In a particularly preferred embodiment of the present invention, the diaphragm valve includes a slit, preferably passing through the center of the orifice in a substantially straight line. The orifice preferably comprises a container neck and the concave diaphragm valve is comprised of a resilient material with a low flexual modulus, such as silicone rubber, polyvinyl chloride, urethane, ethylene vinyl acetate, styrene butadiene copolymer or the like. The resiliently deformable container is preferably comprised of a resilient material with a somewhat higher flexural modulus such as polyethylene, polypropylene, polyvinyl chloride, polyethylene terephthalate or the like. In the illustrated embodiment, the concave portion of the valve is of substantially uniform thickness and is clamped across the end of the orifice by means of a threaded valve securement member which mates with threads on the exterior of the container neck, said valve securement member having a circular aperture substantially coinciding with the concave portion of the diaphragm valve. If desired, an auxiliary sealing member may be employed to prevent actuation or opening of the diaphragm valve until the storage and dispensing package has been delivered to and placed in service by the consumer. In addition it may, if desired, be utilized by the consumer to prevent unwanted discharge after the package has initially been placed in service, e.g., when the package is taken along on trips, etc.

As an alternative, the diaphragm valve could be provided to the consumer without a slit, and the consumer given directions on how to provide the slit by means of a knife or azor blade. In still another embodiment, a line of weakening could be provided in the diaphragam valve such that upon the application of manual force by the consumer, the line of weakening ruptures to form a slit.

In a particularly preferred embodiment the resiliently deformable container is provided with means at its lowermost end, such as an integrally molded hook, for suspending the container in an inverted position, such as from a towel rack in a shower.

Because of its concave shape and the resilient nature of the material of construction, the diaphragm valve requires the attainment of a threshold pressure to effect inversion from its inwardly concave sealed position before it will dispense any of the package contents through one or more non-intersecting slits contained in the concave portion of the valve. Unlike prior art valves employing intersecting slits which merely hingedly unfold in response to internally applied pressure, increased internal pressure applied to a concave diaphragm valve of the present invention forces the opposing edges of each slit to seal more tightly against one another until the threshold pressure is reached. At this point the valve undergoes inversion from a closed, inwardly concave position, to an open, outwardly convex position.

In a particularly preferred embodiment the concave valve inverts by snap-through buckling passing through an unstable dead-center closed position by snap-back buckling. By providing a deformable container exhibiting a degree of flexibility sufficient to permit deformation thereof in response to manual forces applied thereto and a degree of resilience sufficient to return to its undeformed condition upon removal of said manually applied forces, a void volume at least equivalent to the amount of product discharged from the package is provided inside the container. Unlike prior art deadfold metal foil tubes, piston pumps and the like, which exhibit little, if any, tendency to return to their undeformed condition, the void volume thus created in a container of the present invention creates a momentary pressure drop within the container. This momentary pressure drop aids the inverted diaphragm valve in returning toward its inwardly concave position, thereby providing product cut-off. In addition, it typically causes a momentary inward opening of the valve with consequent venting of the container, followed by a return of the valve to a sealed and leak resistant position.

Thus, flexible packages of the present invention facilitate one handed dispensing, as for example in a shower, without the need to physically manipulate the closure member. In addition, because the hydraulic head of the fluid material within the container exerts pressure on the diaphragm valve tending to press the opposing edges of each non-intersecting slit contained in the concave portion of the valve firmly against one another when the container is stored in an inverted position, a seal is provided against product discharge or leakage until a force sufficiently large to overcome the threshold pressure of the resilient diaphragm valve is again applied to the container.

BRIEF DESCRIPTION OF THE DRAWINGS

While the specification concludes with claims particularly pointing out and distinctly claiming the present invention, it is believed the present invention will be better understood from the following description in conjunction with the accompanying drawings in which:

FIG. 3 is a view generally similar to that of FIG. 2, but showing the condition existing when opposed compressive forces "F" are applied to the opposing sidewalls of the container, thereby overcoming the threshold pressure of the self-sealing dispensing valve and extruding the fluid material contents of the package;

FIG. 4 is an illustration of the dispensing package shown in FIG. 3 shown at the instant the opposed compressive forces "F" are removed from the container's opposing sidewalls, said view illustrating the tendency of the container to return to its undeformed condition and the tendency of the dispensing valve to return from its inverted position toward its closed position;

DETAILED DESCRIPTION OF THE PRESENT INVENTION

Figure 1:
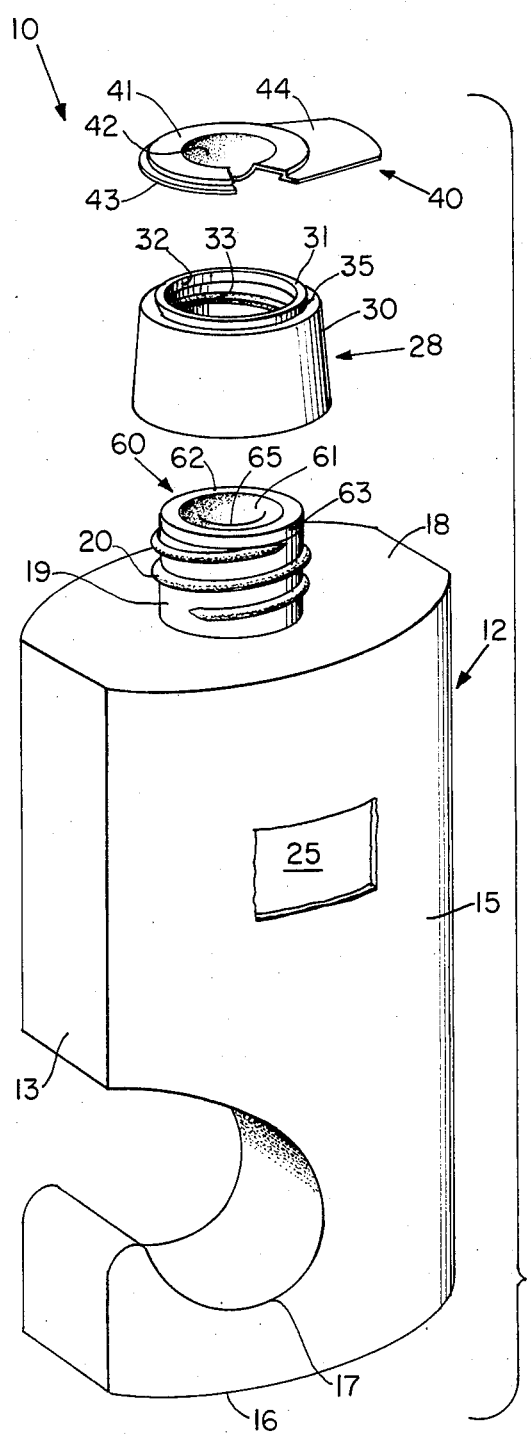
FIG. 1 is a simplified perspective view of a particularly preferred embodiment of a flexible storage and dispensing package of the present invention.

FIG. 1 discloses a particularly preferred embodiment of a flexible storage and dispensing package 10 of the present invention. The illustrated package preferably comprises a resiliently deformable container 12 such as a blow molded plastic bottle comprised of any of several materials well known in the art, e.g., polypropylene, polyethylene, polyvinyl chloride, or the like. The particular material of construction chosen for any given application will, in general, be determined by such factors as product compatibility, cost, permeability and the like. The critical parameter is that the resiliently deformable container 12 exhibit a degree of flexibility sufficient to permit manual deformation of the container to extrude product through dispensing valve 60, and a sufficiently strong predisposition to return to its undeformed condition when external forces are removed that it will create a substantially instantaneous pressure drop inside the container, thereby assisting closure of the self-sealing dispensing valve 60 in use.

Figure 2:
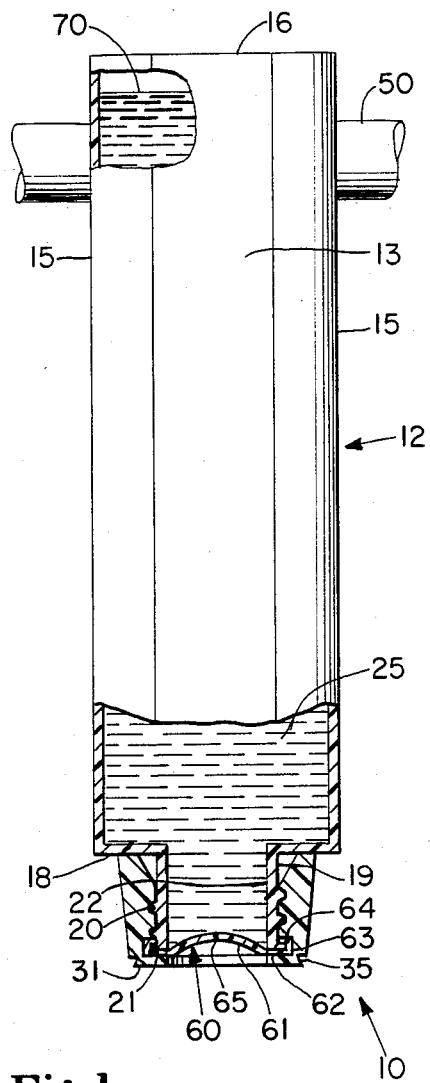
FIG. 2 is a simplified elevation view of the flexible storage and dispensing package of FIG. 1 suspended from a stationary support member such as a towel rack, said view showing portions of the package broken away for clarity.
Figure 10:
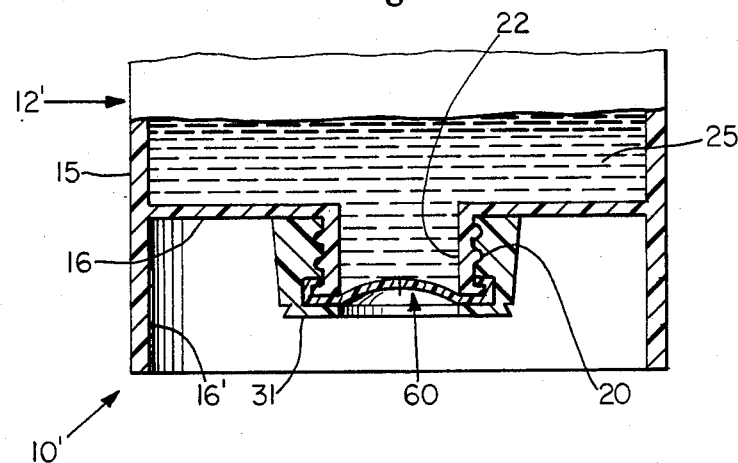
FIG. 10 is a simplified cross-sectional view of the lowermost portion of an alternative storage and dispensing package of the present invention, said package being provided with an extended bottom wall which forms a recessed base for standing the container on a horizontal surface.
Figure 11:
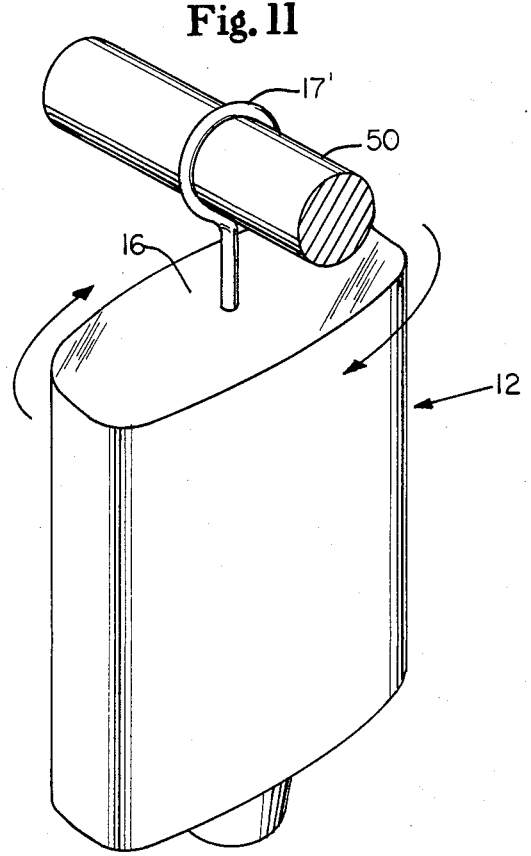
FIG. 11 is a simplified schematic illustration of a storage and dispensing package of the present invention wherein a hook is rotatably secured to the bottom of a container generally similar to that illustrated in FIG. 1.

In the embodiment illustrated in FIGS. 1 and 2, the resiliently deformable container 12 comprises a plastic bottle having a pair of opposed sidewalls 15, a pair of opposed end walls 13, a bottom wall 16, a top wall 18 and a neck portion 19 originating in and extending from the top wall. In the illustrated embodiment, discharge orifice 22 comprises the interior surface of neck portion 19. The lowermost portion of the container 12 is preferably provided with some type of feature which will permit inverted hanging of the container from a support member such as a towel rack 50. In the illustrated embodiment, this takes the form of a recessed notch 17 having the general shape of a hook. It is of course recognized, that the particular means employed for suspending the container 12 in an inverted position in use may be integral with the container or applied as an external attachment, e.g., as a hook 17' rotatably secured to the bottom of the container, as schematically illustrated in FIG. 11. The particular means chosen will be determined by the particular considerations of use. As an alternative to suspending the container in an inverted position, the container could be provided with an overcap designed to permit standing the container in an inverted position. In still another embodiment 10', the container 12 could be provided with an extended bottom wall 16' which forms a recessed base for standing the container on a horizontal surface, and the dispensing valve 60 located in the container's bottom wall, as generally shown in the cross-sectional segment of FIG. 10. Whatever means is chosen, storing the container with the dispensing valve 60 at its lowermost end not only eliminates product drain time from one end of the container to the other during dispensing, but also facilitates completely emptying the container's contents.

As can be seen from FIGS. 1 and 2, the neck portion 19 of the container 12 is preferably provided with suitable securement means, such as a helical thread 20. An outwardly projecting flange 21, shown in FIG. 2, is also preferably provided at or near the end of the neck to provide interlocking sealed engagement with the self-sealing dispensing valve 60. The particular means of securement is non-critical and may comprise, for example, a snap joint, a welded joint, an adhesively secured joint or even integral formation, provided the resilient characteristics of the material comprising the container are also suitable for the dispensing valve.

Dispensing valve 60 preferably comprises a concave shaped portion 61, said concave shaped portion being joined about its periphery to a horizontal flange 62 which in turn is joined to a downwardly projecting annular ring 63 having an inwardly projecting flange 64 which provides interlocking engagement with outwardly projecting flange 21 on container neck portion 19. The self-sealing dispensing valve 60 is preferably comprised of a resilient material, which may be an elastomer such as silicone rubber, and is preferably formed by injection molding. Other resilient materials well known in the art may also be employed for dispensing valve 60, e.g., polyvinyl chloride, urethane, ethylene vinyl acetate, styrene butadiene copolymer and the like.

In the embodiment illustrated in FIG. 1, a linear slit 65 which extends from the innermost to the outermost surface of the concave shaped diaphragm portion 61 of the valve is provided. Linear slit 65 is preferably so positioned that it passes through the center of the valve 60 which in turn is so positioned across the discharge orifice of the container that the center of valve 60 coincides with the centerline of the circular neck portion 19 of the container 12.

In the illustrated embodiment, a valve securement member 28 is also employed. The valve securement member 28 may be comprised of any suitable material, such as plastic. It preferably has an annular skirt 30 having a continuous internal thread 33 which mates with and engages external thread 20 on neck portion 19 of container 12. The uppermost portion of the skirt 30 is joined to an inwardly extending cylindrical flange 31 which exhibits a circular aperture 32 generally coinciding with the maximum diameter of the concave shaped portion 61 of the valve 60. It should be noted that the cylindrical portion of flange 31 overlapping horizontal flange 62 of valve 60 is not essential to securement of the valve to the orifice. If the overlapping portion of flange 31 is eliminated altogether, annular skirt 30 will suffice to prevent dislodging of the valve 60 from the orifice when the flexible container 12 is squeezed. Furthermore, when an overlapping flange 31 is employed, means, such as a pair of interfering thread stops or other means well known in the art (and therefore not shown), are preferably provided on the securement member and container neck to prevent the exertion of substantial compressive forces on horizontal flange portion 62 of valve 60, as it has been observed that compression of flange 62 can adversely impact upon the valve's opening and closing characteristics. The valve securement member 28 prevents inadvertent dislodging of the dispensing valve 60 from the container 12 should unexpectedly high and/or sudden compressive forces "F" be applied to the container sidewalls 15.

In a particularly preferred embodiment, valve securement member 28 includes an inwardly tapered groove 35 which can, if desired, be utilized to releasably secure an auxiliary sealing member 40 in place on the uppermost surface of the valve securement member. In the illustrated embodiment, the sealing member 40 is comprised of plastic and includes an annular flange member 41 having a dependent annular ring 43 which engages groove 35 on securement member 28. A concave shaped portion 42 having a size and shape which mates with the concave shaped diaphragm portion 61 of valve 60 is preferably provided at the interior of flange member 41 to prevent inversion of the self-sealing dispensing valve 60 prior to the consumer placing the container in service. This facilitates leak-proof storage and transport of the flexible storage and dispensing package not only from the manufacturer to the consumer, but also in the event the consumer elects to reseal and carry the package along in his or her travels. If desired, a tab 44 may be provided to remove the sealing member 40 from the valve securement member 28. Alternatively, the sealing member could be joined with the valve securement member, as by a hinge, and they may be formed as a single integral part.

It is further recognized that other types of sealing members may be employed with equal facility. For example, a simple sealing disk could be secured against the uppermost surface in the diaphragm valve 60 by clamping it in position with valve securement member 28.

FIG. 2 illustrates the flexible storage and dispensing package 10 shown in FIG. 1 after it has been placed in service by the consumer. In particular, the auxiliary sealing member 40 has been removed and the resiliently deformable container 12 has been suspended in an inverted position by means of integrally formed hanger groove 17 on a stationary member such as a towel rack 50. As can be seen from the partially broken out segments of FIG. 2, the initial level of the fluid material 25 within container 12 is at elevation 70.

In the condition illustrated in FIG. 2, forces exerted by the fluid pressure acting upon the innermost surface of the hemispherical portion 61 of diaphagm valve 60 are exerted primarily downwardly and inwardly toward the centerline of the neck portion 19 of the container, i.e., normal to the innermost surface of the diaphragm. Because of the inwardly concave shape of the diaphragm portion 61 of valve 60, the inwardly directed component of these pressure generated forces tends to force the opposing edges of slit 65 another one another, thereby tightly sealing the valve and preventing leakage of the fluid contents. This condition prevails at least as long as the resistance of the resilient material comprising the valve prevents the downward component of the forces from displacing the valve and moving it to its inverted, outwardly convex position.

When, as generally shown in FIG. 3, sufficiently great opposing compressive forces "F" are applied to the sidewalls 15 of container 12, the resiliently deformable container is caused to undergo deformation. As will also be apparent from FIG. 3, the deformation of container 12 has exerted sufficient pressure against the innermost surface of the concave shaped portion 61 of valve 60 that the resilient material comprising the valve has undergone complete inversion. As a result, the fluid material 25 is extruded intermediate the opposed edges of slit 65 which are no longer in contact with one another, as generally shown in FIG. 3.

As will be appreciated, opposed compressive forces "F" may be applied very easily by means of the user's thumb and fingers, thereby allowing the user a free hand in which to catch the fluid material 25 being dispensed. Alternatively, the external forces could be applied by pressing the container against a surface such as a wall, with one hand. Thus, a flexible storage and dispensing package 10 of the type herein described has been found particularly suitable as a dispenser for shampoos and hair conditioners in a shower room environment.

Figure 4A:
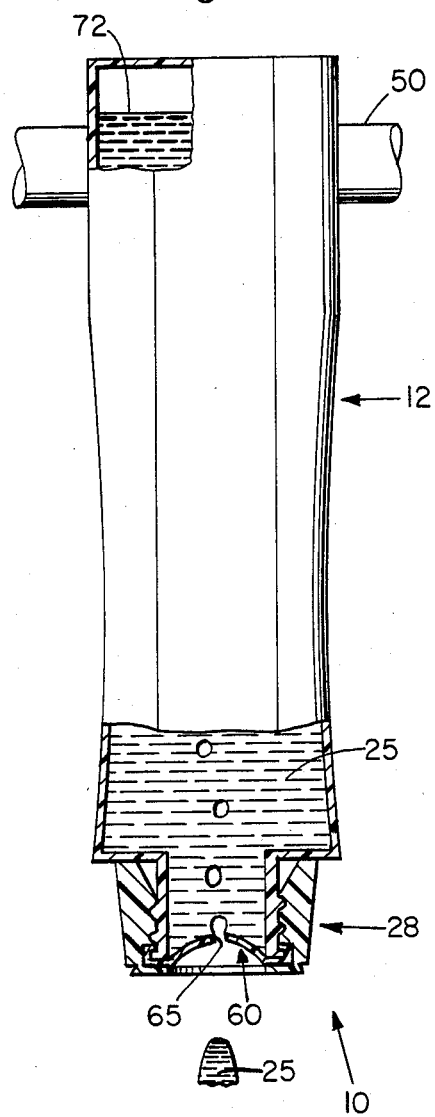
FIG. 4A is an illustration of the dispensing package shown in FIG. 4 while the dispensing valve is in an inwardly open position to provide venting of the container to atmosphere.

FIG. 4 is an illustration of the flexible storage and dispensing package 10 shown in FIG. 3 immediately after removal of the opposed compressive forces "F" from the sidewalls 15 of container 12. Although the container 12 must be sufficiently flexible to permit manual deformation upon the application of an external force or forces, it must also be sufficiently resilient that upon removal of the externally applied force or forces, it exhibits a tendency to return to its undeformed configuration. This creates an almost instantaneous pressure drop within the container, a necessary characteristic of the conatiner to permit substantially instantaneous closure of the inverted dispensing valve 60. Because a quantity of fluid material 25 has been dispensed by the time the opposed compressive forces "F" are removed from the sidewalls 15 of the container 12, restoration of the container to its substantially undeformed condition tends to lower the fluid material 25 to a new level 72 and creates a momentary pressure drop within the container. As can be seen in FIG. 4, the abrupt change in pressure within the container 12 initiates a closing action of the concave diaphragm portion of dispensing valve 60, causing substantially instantaneous cut-off of the fluid material 25. In addition, valve 60 permits inward venting of the surrounding air to dissipate the vaccuum created within the container, as generally shown in FIG. 4A. Thus the dispensing valve 60 also functions as a check valve with respect to venting of the container to relieve negative pressures created by discharge of the package contents.

Figure 5:
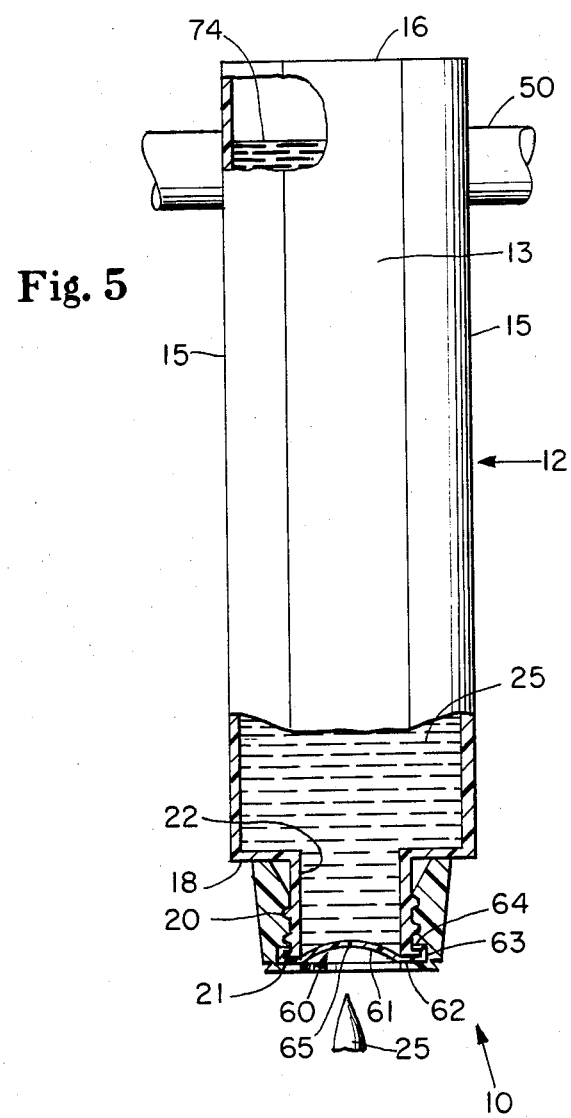
FIG. 5 is a view of the container illustrated in FIG. 4 after it has completely returned to its substantially undeformed, vented condition and the dispensing valve has resumed its inwardly concave sealed position.

FIG. 5 illustrates the condition of the flexible storage and dispensing package 10 after the compressive forces "F" have been removed from the opposing sidewalls 15 of the container 12 and the container has been internally vented to the atmosphere by the action of the valve 60. As a result, it is restored to its substantially undeformed condition. With the exception that the level 74 of fluid material 25 within the inverted container 12 is now at a point below levels 70 and 72, as shown in FIGS. 2 and 4, respectively, the condition of the package 10 is substantially identical to that illustrated in FIG. 2. Accordingly, the slit 65 in the concave portion 61 of dispensing valve 60 is again maintained in a sealed condition, aided by the hydraulic head pressure exerted by the remaining fluid material 25 within the container 12.

Figure 6:
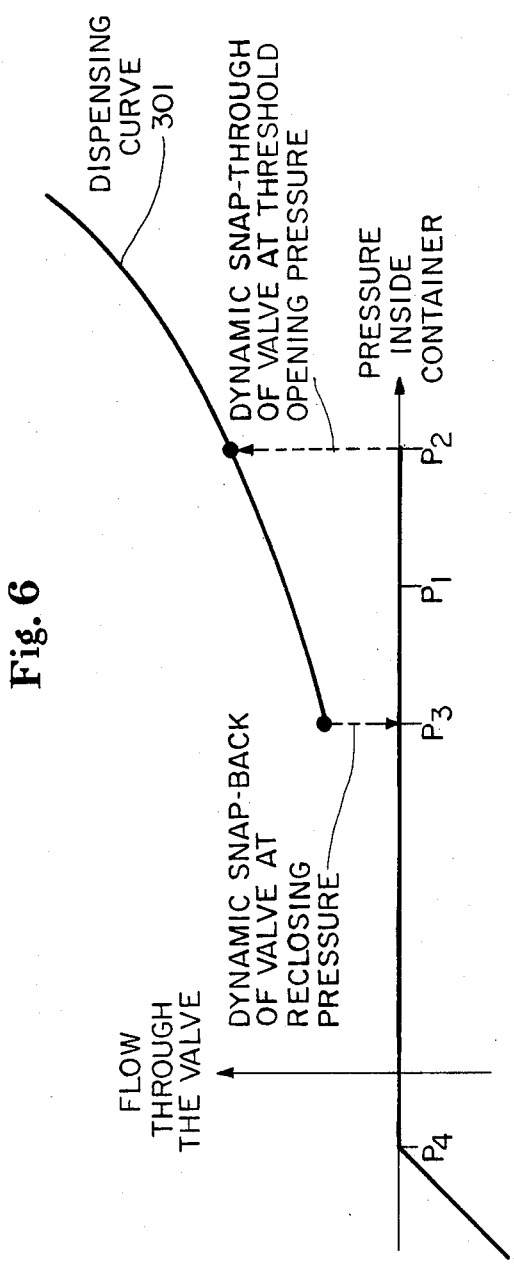
FIG. 6 is a simplified schematic diagram showing the dispensing and venting characteristics of a typical concave dispensing valve of the present invention in relation to the fluid pressure within the storage and dispensing package.

FIG. 6 is a simplified graphical representation which depicts in simplistic terms the effect of increasing the pressure inside the container above atmosphereic pressure, and the effect of decreasing the pressure inside the container below atmospheric pressure on flow through the valve. The pressure $P_1$ represents the maximum hydraulic head pressure of the fluid material present in the inverted container. When the valve is starting from its normally closed position, as shown in FIG. 2, there is no outward material flow through the valve at positive pressure $P_1$ or, for that matter, at any positive pressures below the positive threshold opening pressure $P_2$ required to invert the valve from the condition generally shown in FIG. 2 to the condition generally shown in FIG. 3. When the internal pressure of the container is negative, there may, however, be inward opening of the valve and inwardly directly flow of atmospheric air to vent the container, as generally shown in FIG. 4A. This venting action will occur whenever the negative threshold pressure $P_4$ is achieved. When the positive threshold pressure $P_2$ is achieved, the valve 60 opens outwardly, as generally shown in FIG. 3, and dispenses product in an approximate proportion to the amount of pressure applied, i.e., the greater the applied pressure the greater the flow rate will be, at least until the maximum dispensing rate is achieved.

If, upon reclosing, the negative pressure within the container reaches the negative threshold pressure $P_4$, shown in FIG. 6, the valve will momentarily open inwardly, as generally shown in FIG. 4A, to at least partially vent the interior of the container. Thus, after a typical dispensing cycle, sufficient air from the surrounding atmosphere is allowed to enter the container intermediate the opposing edges of slit 65 to produce an internal pressure which approaches atmospheric pressure. When this occurs, a sealed condition of the dispensing valve, such as that generally illustrated in FIG. 5, prevails.

While not wishing to be bound, it is believed that the dispensing valve 60 inverts to snap-buckling. It is believed that the snap-buckling of valve 60 is generally similar to buckling of very flat curved bars, as described at length at pages 305–311 of a publication entitled THEORY OF ELASTIC STABILITY by Stephen P. Timoshenko and J. Gere, McGraw-Hill Book Company, 1961, said publication being hereby incorporated herein by reference. FIG. 6 is a simplified graphic representation which generally depicts the characteristics of a snap-buckling valve and the effect of pressure inside the container on flow through the dispensing valve. The pressure $P_1$ represents the maximum hydraulic head pressure of the fluid material present in the inverted container. When opposed compressive forces "F" are initially applied to resilient container 12, there is no outward flow through the valve at positive pressure $P_1$. When the pressure is increased and the positive threshold pressure $P_2$ is reached, the valve buckles through an unstable intermediate position indicated by the dashed arrow at positive threshold pressure $P_2$, onto the valve's dispensing curve 301, i.e., the valve undergoes snap-through buckling and inverts substantially instantaneously to a second stable position at pressure $P_2$ in which the valve is open, as generally shown in FIG. 3. It is believed that the manually applied forces "F" utilized to discharge product from the container do not normally permit the pressure inside the container to drop immediately upon attainment of the threshold opening pressure $P_2$. Since the internal pressure normally continues to increase beyond pressure $P_2$ in response to the manually applied forces "F", the flow through the valve increases along valve's dispensing curve 301 as the pressure inside the container is increased. In the condition shown in FIG. 3, fluid flows from the container through the valve at a relatively high rate.

When the pressure inside the container decreases from some pressure above positive threshold pressure $P_2$, flwo will continue, as indicated the valve's dispensing curve 301 depicted in FIG. 6, even when the pressure drops below positive threshold pressure $P_2$. As can be seen in FIG. 6, this condition continues until the reclosing pressure $P_3$ is reached. At pressure $P_3$ the valve buckles through another unstable intermediate position indicated by the dashed arrow at $P_3$, i.e., the valve undergoes snap-back buckling and inverts substantially instantaneously, as generally shown in FIGS. 4 and 4A, back to the original closed position generally shown in FIG. 5.

Thus, it is believed that FIG. 6 shows, in simplified terms, the general characteristics of the opening and reclosing of the valve via snap-through and snap-back buckling. It is not, however, intended to show the relative magnitude of the reclosing pressure $P_3$ in relation to the hydraulic head pressure $P_1$ of the fluid remaining in the container. Reclosing pressure $P_3$ may, by proper valve design and material selection, be greater than or less than the maximum hydraulic head pressure $P_1$, as desired.

It has also been observed that nearly any desired positive threshold opening pressure $P_2$ may be provided by proper valve design and material selection. Normally, the threshold opening pressure $P_2$ is somewhat greater than the maximum hydraulic head pressure of the fluid in the container to allow for sustained inversion of the package without leakage and, in addition, to prevent unwanted discharge due to pressure fluctuations caused by in-use handling of the container. However, depending on the circumstances of use, nearly any desired threshold pressure may be provided in the valve.

The threshold opening pressure $P_2$ is influenced by a number of variables. Of these variables, the threshold pressure for a valve with a concave portion of a given maximum diameter, as measured at its periphery, may be conveniently controlled by altering either the thickness of the concave portion or its radius of curvature. Alternatively, a valve material having a different flexual modulus may be selected. It is of course recognized that the threshold opening pressure $P_2$ can also be altered by simultaneously altering the combination of these variables with one another. In general, when all other design variables are held constant: the threshold opening pressure $P_2$ will increase with an increase in thickness, it will increase with an increase in flexural modulus, or it will increase with a decrease in the radius of curvature. While these variables normally provide sufficient latitude to obtain any desired threshold pressure, any single variable may not be changed without limit. For example, choosing a valve with an extremely small thickness will decrease the surface contact area between opposing edges of each slit. This can decrease the ability of the opposing slit edges to seal properly against one another. Conversely, choosing a valve with an extremely large thickness can create interference of the opposing slit edges with one another, particularly as the valve flexes inwardly in the manner generally shown in FIG. 4A to vent the package to the atmosphere.

Although the concave portion of the valve embodiments illustrated herein exhibit a substantially uniform thickness, it is recognized that the thickness of the concave portion of the valve could vary without departing from the scope of the present invention. For example, the portion of the valve containing the slit could be locally increased to increase the surface contact area of the opposing edges of the slit, thereby increasing the self-sealing tendency of the valve without greatly increasing its threshold opening pressure.

It has also been observed that although the precise manner of securement of valve 60 across the container's discharge orifice 22 is generally non-critical, the manner of securement can influence the threshold opening pressure $P_2$ of the valve. In this regard, it should be noted that when the horizontal flange 62 of valve 60 is unrestrained, e.g., as by eliminating inwardly extending flange 31 on valve securement member 28 (FIG. 1), the threshold opening pressure $P_2$ is reduced. This is believed due to a limited degree of flexing which occurs in horizontal flange 62 during snap-through opening and snap-back reclosing of valve 60. Whatever manner of securement is selected, it has been pointed out earlier herein that substantial compressive forces should not be applied directly to horizontal flange 62, since they can adversely impact upon the valve's opening and closing characteristics.

In order to make the dispensing valve less sensitive to dimensional variation which can make its peformance more difficult to predict or control, it is generally desirable to mount the concave portion of the valve so that the horizontal flange surrounding the concave portion may flex and/or deflect radially as the concave portion of the valve snaps through center. In general, a higher threshold opening pressure results when the periphery of the concave portion of the valve is constrained, and the concave portion of the valve comes through center with relatively high kinetic energy. This can lead to slinging of the fluid material in contact with the valve. Accordingly, for applications which do not require a flush mounted valve of the type generally shown in FIG. 1, a free standing design such as that shown in FIG. 9 may be employed.

Figure 9:
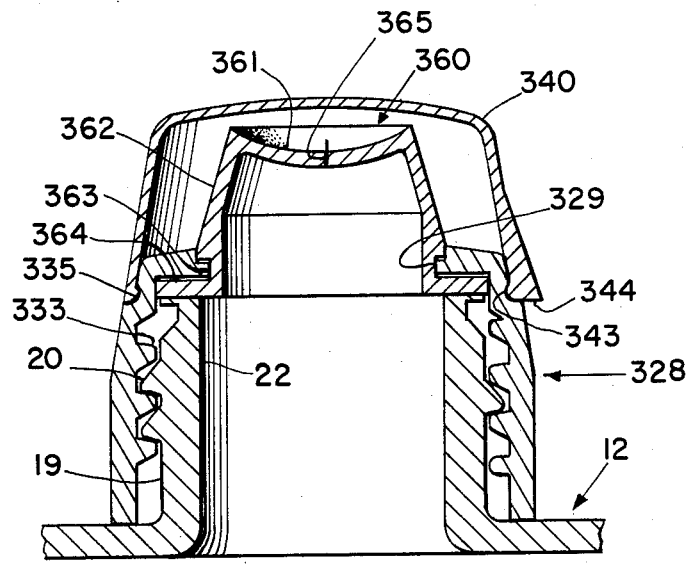
FIG. 9 is a simplified cross-sectional view of still another dispensing valve of the present invention.

Self-sealing dispensing valve 360 shown in cross-section in FIG. 9 employs a single, centrally located slit 365 in its concave portion 361. Note, however, that the periphery of the concave portion 361 of valve 360 is continuously secured about its periphery to one end of a resilient annular sidewall 362 which is oriented in a direction generally aligned with the axis of the neck portion 19 of container 12. The lowermost end of annular sidewall 362 is provided with a circumferential groove 363 and an outwardly extending horizontal flange 364, as generally shown in FIG. 9. An internally threaded valve securement member 328 employs an inwardly extending flange 329 which mates with and engages groove 363 on valve 360. The outwardly extending horizontal flange 364 of valve 360 is secured in sealed relation across the discharge orifice 22 of the container 12 when thread 333 of valve securement member 328 engages mating thread 20 on neck portion 19 of container 12.

If desired, a protective closure member 340 emloying an inwardly extending annular flange 343 may be secured to valve securement member 328 by engagement with a mating groove 335 on the exterior of the valve securement member. Also if desired, a lift tap 344 may be provided on protective closure member 340 to facilitate easy removal and exposure of self-sealing dispensing valve 360.

As will be appreciated from the foregoing description, because the periphery of the concave portion 361 of valve 360 is not restrained by a rigid member, the valve 360 is free to undergo slight flexing and radial deflection when external forces are exerted upon container 12. Accordingly, valve 360 will open at a lower threshold pressure and with less kinetic energy than a valve of comparable design and thickness which is restrained about the periphery of its concave portion. In certain applications, the resultant softer opening action may be desirable, since it avoids slinging product from the surface of the valve as it snaps through center. In addition, the softer opening action provides the user with a greater ability to accurately dispense small quantities of product.

As will be appreciated by those skilled in the art, it is not essential that the dispensing valve 60 be secured directly to the resiliently deformable container 12 to obtain the benefits afforded by the present invention. If desired, the valve 60 could be sealingly secured to a closure member generally similar to the valve securement member 28 illustrated herein with similar result. As will be appreciated by those skilled in the art, this could, if desired, be accomplished by co-injection molding the closure member and the valve from dissimilar polymeric materials.

In still another embodiment of the present invention, the discharge valve and the container could be comprised of the same material and integrally molded with one another. This approach would be particularly suitable for a resilient tube-like structure which could then be filled with the fluid product to be dispensed from its oppositely disposed open end and thereafter sealed.

In a particularly preferred embodiment of the present invention, a flexible storage and dispensing package 10 was created utilizing a resiliently deformable blow molded polypropylene plastic bottle having a generally elliptical cross-section measuring approximately 1.57 inches (40 millimeters) by 3.14 inches (80 millimeters), an overall body height of approximately 6.89 inches (175 millimeters), a discharge orifice measuring approximately 0.69 inches (17.5 millimeters) in diameter, and an average wall thickness in the range of 0.039 to 0.078 inches (1 to 2 millimeters). A silicone rubber dispensing valve 60 was injection molded from MDX-4-4210 Silicone Elastomer available from Dow Corning of Midland, Mich. The valve exhibited a concave portion 61 having a uniform thickness of about 0.040 inches (1.02 millimeters) and a radius of curvature of approximately 0.407 inches (10.33 millimeters), as measured at the exposed surface of the valve when the valve is installed on the container. A straight slit passing through the center of the valve and measuring approximately 0.375 inches (9.53 millimeters) from end-to-end was provided in the concave portion of the valve. The valve was secured to the discharge orifice of the container by means of a threaded valve securement member of the type generally illustrated on FIG. 1. The concave portion of the valve 60 measured approximately 0.669 inches (17 millimeters) at its maximum diameter, i.e., at its periphery. The threshold opening pressure $P_2$ was found to be 12.3 inches of water and the reclosing pressure $P_3$ was 5.5 inches of water, as measured by observation using a static water manometer with the valve installed at the bottom of the column of water. When all other variables were held constant and the thickness of the concave portion of the valve was increased to 0.050 inches (1.27 millimeters), the threshold opening pressure $P_2$ increased to 17.5 inches of water and the reclosing pressure $P_3$ increased to 7.5 inches of water. When the resilient blow molded polypropylene storage and dispensing container was suspended with the valve in place in an inverted condition by means of a metal hook engaging grooves in the sidewalls of the container, it proved to be highly effective in dispensing shampoo when the opposed walls of the container were squeezed with the thumb and fingers. In addition, it provided automatic product cut-off when the compressive forces on the container were released and leak-resistant sealing intermediate dispensing cycles.

Figure 7:
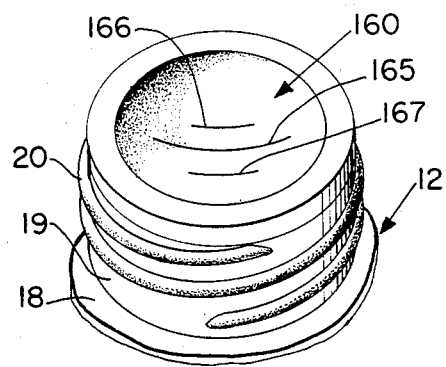
FIG. 7 is a simplified perspective view of an alternative dispensing valve of the present invention.

In FIG. 7 there is shown an alternative embodiment of a dispensing valve 160 of the present invention secured to the neck portion 19 of a resiliently deformable container 12 of the type generally shown in FIG. 1. For simplicity, only the neck portion of the container has been illustrated. Dispensing valve 160 is in most respects identical to dispensing valve 60 generally disclosed in FIG. 1. Slit 165 in dispensing valve 160 is substantially identical to slit 65 in dispensing valve 60. However, dispensing valve 160 includes an additional pair of slits 166 and 167 which are oriented generally parallel to slit 165 and spaced equidistant therefrom. Slits 166 and 167 are shorter in overall length than slit 165. In general, dispensing valve 160 exhibits opening and closing characteristics which are in principle similar to those exhibited by single slit dispensing valve 60. Fluid material contained within container 12 will, of course, be discharged in three discrete streams, provided slits 166 and 167 are spaced sufficiently far from slit 165.

Figure 8:
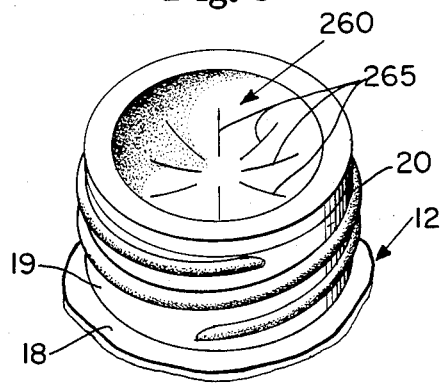
FIG. 8 is a simplified perspective view of another dispensing valve of the present invention.

FIG. 8 discloses still another embodiment of a dispensing valve 260 of the present invention secured to the neck portion 19 of a resiliently deformable container 12 of the type generally shown in FIG. 1. Dispensing valve 260 is in most respects similar to dispensing valves 160 shown in FIG. 7 and 60 shown in FIG. 1. However, dispensing valve 260 employs a multiplicity of radially extending, non-intersecting slits 265, as generally shown in FIG. 8. The opening characteristics exhibited by dispensing valve 260 are generally similar to those exhibited by dispensing valves 160 and 60. However, fluid material will be discharged through dispensing valve 260 in a multiplicity of streams oriented generally outwardly from the center of the valve, each stream of fluid material corresponding to one of the slits 265 in the dispensing valve 260.

From the embodiments of the present invention herein disclosed, it will be appreciated that the present invention may be practiced to advantage employing one or more slits in the concave shaped portion of the dispensing valve, provided the slits are non-intersecting with one another. Because the slits are non-intersecting, the opening characteristics of the valve are believed to be dependent upon a snap-buckling phenomenon which results in a complete inversion of the entire valve at a predetermined theshold pressure. By way of contrast, prior art valves employing intersecting slits typically respond to increased internal pressure by a gradual pivoting of one or more angularly shaped elements formed by the intersecting slits along fold lines which interconnect the outermost ends of the intersecting slits. Because increased internal pressure serves to force the opposing edges of each non-intersecting slit more tighty against one another until such time as the opening threshold pressure is achieved, dispensing valves of the present invention are highly leak resistant. By way of contrast, any increase of internal pressure applied to prior art valve employing intersecting slits has a tendency to initiate pivoting of the angularly shaped elements formed by the intersecting slits. It is this distinction in the opening and closing mechanism which provides crisp on and off action as well as leak resistance in dispensing valve of the present invention, characteristics not found in prior art dispensing valves employing intersecting slits.

In this regard, it should also be noted that each of the slits illustrated in dispensing valves of the present invention is substantially linear in character. While it is not a requirement that each slit be absolutely straight, the term "substantially linear" as utilized herein to characterize such slits means that any deviation from a straight line should not be significant enough to create a fold line anywhere along the length of the slit, since the creation of such a fold line will convert the opening mechanism of the valve from a snap-buckling phenomenon to a pivoting phenomenon.

While particular embodiments of the present invention have been illustrated and described, it will be obvious to those skilled in the art that various changes and modifications can be made without departing from the spirit and scope of the invention, and it is intended to cover in the appended claims all such modifications that are within the scope of this invention.

What is claimed is:

1. A flexible package for storing and dispensing a fluid material through a discharge orifice in response to manually applied forces and for automatically ceasing the dispensing operation when said manually applied forces are removed, said package also being resistant to leakage when stored with its discharge orifice downwardly oriented intermediate dispensing cycles, said package comprising:
   (a) a resiliently deformable container for housing said fluid material, said container exhibiting a degree of flexibility sufficient to permit deformation thereof in response to manual forces applied thereto and a degree of resilience sufficient to return automatically to its undeformed condition when said manually applied forces are removed therefrom, said container including said discharge orifice; and
   (b) a self-sealing dispensing valve which opens at a predetermined threshold pressure which is greater than the maximum hydraulic head pressure of the fluid material in said container when said discharge orifice is downwardly oriented, said self-sealing dispensing valve being sealingly secured about its periphery across said discharge orifice of said container, said dispensing valve having a centrally located portion comprised of resilient material, said centrally located portion exhibiting a predetermined concave shape while in a substantially unstressed condition when said valve is sealingly secured across said discharge orifice of said container, said valve being oriented relative to said discharge orifice so that said centrally located resilient portion is inwardly concave when said container is in an undeformed condition, said concave shaped resilient portion of said valve including at least one substantially linear slit extending through its thickness from its innermost surface to its outermost surface, said valve exhibiting an ability to undergo inversion from a closed, inwardly concave, sealed and leak-resistant position to an open, outwardly convex, unsealed position when said manually applied forces increase the pressure inside said container beyond the threshold opening pressure of said valve, whereby fluid material is discharged from said container through said slit in said valve as long as said manually applied forces on said container maintain an internal pressure exceeding said threshold opening pressure of said valve, said valve further exhibiting an ability to automatically cut-off said fluid material discharge by returning to a closed, inwardly concave, sealed and leak-resistant position whenever said manually applied forces are removed from said container.

2. The flexible package of claim 1, wherein said self-sealing dispensing valve is comprised of silicone rubber.

3. The flexible package of claim 1, wherein said concave shaped portion of said self-sealing dispensing valve is of substantially uniform thickness.

4. The flexible package of claim 1, wherein said self-sealing dispensing valve is sealingly secured across said neck on said container by means of a valve securement member engaging said neck, said valve securement member and said valve being sealingly secured to one another by co-injection molding from dissimilar polymeric materials.

5. The flexible package of claim 1, wherein said concave shaped portion of said self-sealing dispensing valve is integrally molded across the discharge orifice of said resiliently deformable container.

6. The flexible package of claim 1, wherein said concave shaped portion of said self-sealing dispensing valve contains a multiplicity of non-intersecting substantially linear slits.

7. The flexible package of claim 6, wherein said non-intersecting substantially linear slits are aligned substantially parallel to one another.

8. The flexible package of claim 1, wherein said centrally located concave shaped portion of said self-sealing dispensing valve is not rigidly constrained about its periphery.

9. The flexible package of claim 8, wherein said centrally located concave shaped portion of said self-sealing dispensing valve is secured to one end of a resilient annular sidewall, the other end of said resilient annular sidewall being sealingly secured about its periphery across said discharge orifice of said container.

10. The flexible package of claim 1, wherein said deformable container includes means for storing said container with its discharge orifice downwardly oriented intermediate dispensing cycles.

11. The flexible package of claim 10, wherein said means for storing said container with its discharge orifice downwardly oriented comprises suspension means.

12. The flexible package of claim 10, wherein said means for suspending said container comprises a hook located at the bottom of said container.

13. The flexible package of claim 12, wherein said hook is rotatably secured to the bottom of said container.

14. The flexible package of claim 1, wherein said deformable container is comprised of plastic and said discharge orifice comprises a neck on said container.

15. The flexible package of claim 14, wherein said self-sealing dispensing valve is sealingly secured across said neck on said container by means of interlocking flanges.

16. The flexible package of claim 14, wherein said self-sealing dispensing valve is sealingly secured across said neck on said container by means of a valve securement member engaging said neck, said valve securement member having a concentrically aligned circular orifice in its uppermost surface, said circular orifice having a diameter at least equal to the maximum diameter of the concave shaped portion of said self-sealing dispensing valve, as measured at the periphery of said concave shaped portion.

17. The flexible package of claim 16, including an auxiliary sealing member releasably secured to said valve securement member, said auxiliary sealing member having a size and shape substantially coninciding with the outermost surface of the concave shaped portion of said self-sealing dispensing valve to prevent opening thereof at pressures in excess of the threshold opening pressure of said valve prior to removal of said auxiliary sealing member.

18. A flexible package for storing and dispensing a fluid material through a discharge orifice in response to manually applied forces and for automatically ceasing the dispensing operation and venting the package to the atmosphere when said manually applied forces are removed, said package also being resistant to leakage when stored with its discharge orifice downwardly oriented intermediate dispensing cycles, said package comprising:
   (a) a resiliently deformable plastic bottle for housing said fluid material, said bottle exhibiting a degree of flexibility sufficient to permit deformation thereof in response to manual forces applied thereto and a degree of resilience sufficient to return automatically to its undeformed condition when said manually applied forces are removed therefrom, said bottle including said orifice, said orifice comprising a neck on said bottle; and (b) a self-sealing dispensing valve which opens at a predetermined threshold pressure which is greater than the maximum hydraulic head pressure of the fluid material in said bottle when said discharge orifice is downwardly oriented, said self-sealing dispensing valve being sealingly secured about its periphery across said discharge orifice of said bottle, said dispensing valve having a centrally located portion comprised of resilient elastomeric material, said centrally located portion exhibiting a predetermined concave shape while in a substantially unstressed condition when said valve is sealingly secured across valve being oriented relative to said discharge orifice so that said centrally located elastomeric portion is inwardly concave when said bottle is in an undeformed condition, said concave shaped elastomeric portion of said valve including at least one substantially linear slit extending through its thickness from its innermost surface to its outermost surface, said valve exhibiting an ability to undergo inversion from a closed, inwardly concave, sealed and leak-resistant position to an open, outwardly convex, unsealed position when said manually applied forces increase the pressure inside said container beyond the threshold opening pressure of said valve, whereby fluid material is discharged from said bottle through said slit in said valve as long as said manually applied forces on said bottle maintain an internal pressure exceeding said threshold opening pressure of said valve, said valve further exhibiting an ability to automatically cut-off said fluid material discharge by returning to a closed, inwardly concave, sealed and leak resistant position whenever said manually applied forces are removed from said bottle.

19. The flexible package of claim 18, wherein said concave shaped portion of said self-sealing dispensing valve is of substantially uniform thickness.

20. The flexible package of claim 18, wherein said concave shaped portion of said self-sealing dispensing valve contains a multiplicity of non-intersecting substantially linear slits.

21. The flexible package of claim 20, wherein said non-intersecting substantially linear slits are aligned substantially parallel to one another.

22. The flexible package of claim 18, wherein said centrally located concave shaped portion of said self-sealing dispensing valve is not rigidly constrained about its periphery.

23. The flexible package of claim 22, wherein said centrally located concave shaped portion of said self-sealing dispensing valve is secured to one end of a resilient annular sidewall, the other end of said resilient annular sidewall being sealingly secured about its periphery across said discharge orifice of said container.

24. The flexible package of claim 18, wherein said self-sealing dispensing valve is sealingly secured across said neck of said bottle by means of interlocking flanges.

25. The flexible package of claim 24, wherein said self-sealing dispensing valve is sealingly secured across said neck of said bottle by means of a valve securement member engaging said bottle neck, said valve securement member having a concentrically aligned circular orifice in its uppermost surface, said circular orifice having a diameter at least equal to the maximum diameter of the concave shaped portion of said self-sealing dispensing valve, as measured at the periphery of said concave shaped portion.

26. The flexible package of claim 25, including an auxiliary sealing member releasably secured to said valve securement member, said auxiliary sealing member having a size and shape substantially coinciding with the outermost surface of the concave shaped portion of said self-sealing dispensing valve to prevent opening thereof at pressures in excess of the threshold opening pressure of said valve prior to removal of said auxiliary sealing member.

27. The flexible package of claim 18, wherein said deformable plastic bottle includes means for storing said bottle with its discharge orifice downwardly oriented intermediate dispensing cycles.

28. The package of claim 27, wheein said means for suspending said plastic bottle is integrally molded therewith.

29. The flexible package of claim 27, wherein said means for suspending said plastic bottle comprises a hook secured to the bottom of said bottle.

30. The flexible package of claim 29, wherein said hook is rotatably secured to the bottom of said plastic bottle.

31. The flexible package of claim 27, wherein said means for storing said bottle with its discharge orifice downwardly oriented comprises means for standing said bottle on a horizontal surface.

32. The flexible package of claim 31, wherein the plastic bottle includes a bottom wall, wherein the discharge orifice is located in the bottom wall of said plastic bottle and said means for standing said bottle on a horizontal surface comprises an extension of said bottom wall.

33. A flexible package for storing and dispensing a fluid material through a discharge orifice in response to manually applied forces and for automatically ceasing the dispensing operation when said manually applied forces are removed, said package also being resistant to leakage when stored with its discharge orifice downwardly oriented intermediate dispensing cycles, said package comprising:

(a) a resiliently deformable container for housing said fluid material, said container exhibiting a degree of flexibility sufficient to permit deformation thereof in response to manual forces applied thereto and a degree of resilience sufficient to return automatically to its undeformed condition when said manually applied forces are removed therefrom, said container including said discharge orifice; and (b) a self-sealing dispensing valve which opens at a predetermined threshold pressure which is greater than the maximum hydraulic head pressure of the fluid material in said container when said discharge orifice is downwardly oriented, said self-sealing dispensing valve being releasably and sealingly secured about its periphery across said discharge orifice in said container, said dispensing valve having a centrally located portion comprised of resilient material, said centrally located portion exhibiting a predetermined concave shape while in a substantially unstressed condition when said valve is sealingly secured across said discharge orifice of said container, said valve being oriented relative to said discharge orifice so that said centrally located resilient portion is inwardly concave when said container is in an undeformed condition, said concave shaped resilient portion of said valve including at least one substantially linear slit extending through its thickness from its innermost surface to its outermost surface, said valve exhibiting an ability to undergo snap-through buckling and inversion from a closed, inwardly concave, sealed and leak-resistant position to an open, outwardly convex, unsealed position when said manually applied forces increase the pressure inside said container beyond the threshold opening pressure of said valve, whereby fluid material is discharged from said container through said slit in said valve as long as said manually applied forces on said container maintain an internal pressure exceeding said threshold opening pressure of said valve, said valve further exhibiting an ability to automatically cut-off said fluid material discharge by undergoing snap-back buckling back to a closed, inwardly concave, sealed and leak resistant position whenever said manually applied forces are removed from said container.

34. A flexible package for storing and dispensing a fluid material through a discharge orifice in respone to manually applied forces and for automatically ceasing the dispensing operation when said manually applied forces are removed, said package also being resistant to leakage when stored with its discharge orifice downwardly oriented intermediate dispensing cycles, said package comprising:
  (a) a resiliently deformable container for housing said fluid material, said container exhibiting a degree of flexibility sufficient to permit deformation thereof in response to manual forces applied thereto and a degree of resilience sufficient to return automatically to its undeformed condition when said manually applied forces are removed therefrom, said container including said discharge orifice; and
  (b) a self-sealing dispensing valve which opens at a predetermined threshold pressure which is greater than the maximum hydraulic head pressure of the fluid material in said container when said discharge orifice is downwardly oriented, said self-sealing dispensing valve being sealingly secured about its periphery across said discharge orifice of said container, said dispensing valve having a centrally located portion comprised of resilient material, said centrally located portion exhibiting a predetermined concave shape while in a substantially unstressed condition when said valve is sealingly secured across said discharge orifice of said container, said valve being oriented relative to said discharge orifice so that said centrally located resilient portion is inwardly concave when said container is in an undeformed condition, said concave shaped resilient portion of said valve including a multiplicity of non-intersecting substantially linear slits extending through its thickness from its innermost surface to its outermost surface, said valve exhibiting an ability to undergo inversion from a closed, inwardly concave, sealed and leak-resistant position to an open, outwardly convex, unsealed position when said manually
applied forces increase the pressure inside said container beyond the threshold opening pressure of said valve, whereby fluid material is discharged from said container through said slits in said valve as long as said manually applied forces on said container maintain an internal pressure exceeding said threshold opening pressure of said valve, said valve further exhibiting an ability to automatically cut-off said fluid material discharge by returning to a closed, inwardly concave, sealed and leak-resistant position whenever said manually applied forces are removed from said container.

35. A flexible package for storing and dispensing a fluid material through a discharge orifice in response to manually applied forces and for automatically ceasing the dispensing operation and venting the package to the atmosphere when said manually applied forces are removed, said package also being resistant to leakage when stored with its discharge orifice downwardly oriented intermediate dispensing cycles, said package comprising:
  (a) a resiliently deformable plastic bottle for housing said fluid material, said bottle exhibiting a degree of flexibility sufficient to permit deformation thereof in response to manual forces applied thereto and a degree of resilience sufficient to return automatically to its undeformed condition when said manually applied forces are removed therefrom, said bottle including said orifice; said orifice comprising a neck on said bottle; and
  (b) a self-sealing dispensing valve which opens at a predetermined threshold pressure which is greater than the maximum hydraulic head pressure of the fluid material in said bottle when said discharge orifice is downwardly oriented, said self-sealing dispensing valve being sealingly secured about is periphery across said discharge orifice of said bottle, said dispensing valve having a centrally located portion comprised of resilient elastomeric material, said centrally located portion exhibiting a predetermined concave shape while in a substantially unstressed condition when said valve is sealingly secured across said discharge orifice of said container, said valve being oriented relative to said discharge orifice so that said centrally located elastomeric portion is inwardly concave when said container is in an undeformed condition, said concave shaped elastomeric portion of said valve including a multiplicity of non-intersecting substantially linear slits radially oriented about its center and extending through its thickness from its innermost surface to its outermost surface, said valve exhibiting an ability to undergo inversion from a closed, inwardly concave, sealed and leak-resistant position to an open, outwardly convex, unsealed position when said manually applied forces increase the pressure inside said container beyond the threshold opening pressure of said valve, whereby fluid material is discharged from said container through said slits in said valve as long as said manually applied forces on said bottle maintain an internal pressure exceeding said threshold opening pressure of said valve, said valve further exhibiting an ability to automatically cut-off said fluid material discharge by returning to a closed, inwardly concave, sealed and leak-resistant position whenever said manually applied forces are removed from said bottle.

* * * * *

UNITED STATES PATENT AND TRADEMARK OFFICE
CERTIFICATE OF CORRECTION

PATENT NO. : 4,728,006

DATED : March 1, 1988

INVENTOR(S) : James L. Drobish and Leo E. Taske

Page 1 of 2

It is certified that error appears in the above-identified patent and that said Letters Patent is hereby corrected as shown below:

Column 2, line 22, "dispending" should read -- dispensing --.

Column 2, line 67, "ino" should read -- into --.

Column 3, line 16, "froce" should read -- force --.

Column 4, line 20, "past" should read -- paste --.

Column 4, line 46, "of" should read -- by --.

Column 4, line 51, "sepum" should read -- septum --.

Column 4, line 65, "resistant" should read -- resistance --.

Column 5, line 51, "flexual" should read -- flexural --.

Column 6, line 8, "azor" should read -- razor --.

Column 6, line 36, after "dead-center" insert -- position to an open convex position and returns to the concave --.

Column 10, line 6, "in" should read -- of --.

Column 10, line 15, after "stationary" insert -- support --.

Column 10, line 28, "another" should read -- against --.

Column 10, line 61, "Althrough" should read -- Although --.

Column 11, line 1, "conatiner" should read -- container --.

Column 11, line 15, "vaccuum" should read -- vacuum --.

Column 11, line 37, "atmosphereic" should read -- atmospheric --.

Column 11, line 51, "directly" should read -- directed --.

Column 12, line 6, "to" should read -- by --.

Column 12, line 44, "flwo" should read -- flow --.

Column 13, line 15, "flexual" should read -- flexural --.

UNITED STATES PATENT AND TRADEMARK OFFICE
CERTIFICATE OF CORRECTION

PATENT NO. : 4,728,006

DATED : March 1, 1988

INVENTOR(S) : James L. Drobish and Leo E. Taske

It is certified that error appears in the above-identified patent and that said Letters Patent is hereby corrected as shown below:

Column 13, line 64, "variation" should read -- variations --.

Column 13, line 64, "peformance" should read -- performance --.

Column 16, line 35, "tighty" should read -- tightly --.

Column 16, line 40, "valve" should read -- valves --.

Column 18, Claim 17, line 49, "coninciding" should read -- coinciding --.

Column 19, Claim 18, line 17, after "across" insert -- said discharge orifice of said container, said --.

Signed and Sealed this

Twelfth Day of July, 1988

Attest:

DONALD J. QUIGG

*Attesting Officer*   *Commissioner of Patents and Trademarks*